(12) United States Patent
Laby (10) Patent No.: US 6,888,333 B2
(45) Date of Patent: May 3, 2005

(54) HOLONOMIC PLATFORM FOR A ROBOT

(75) Inventor: Keith Phillip Laby, Santa Barbara, CA (US)

(73) Assignee: InTouch Health, Inc., Goleta, CA (US)

( * ) Notice: Subject to any disclaimer, the term of this patent is extended or adjusted under 35 U.S.C. 154(b) by 6 days.

(21) Appl. No.: 10/614,574

(22) Filed: Jul. 2, 2003

(65) Prior Publication Data
US 2005/0001576 A1 Jan. 6, 2005

(51) Int. Cl.[7] .................................................. B25J 5/00
(52) U.S. Cl. ............ 318/568.12; 318/585; 318/568.11; 180/343; 701/23
(58) Field of Search ..................... 318/568.01–568.22, 318/586–589, 139; 180/252, 253, 204, 6.5, 168, 6.62, 21, 22; 901/1; 248/122.1; 16/25, 27

(56) References Cited

U.S. PATENT DOCUMENTS

| | | | | | |
|---|---|---|---|---|---|
| 3,821,995 | A | * | 7/1974 | Aghnides | 180/6.2 |
| 4,413,693 | A | * | 11/1983 | Derby | 180/343 |
| 4,519,466 | A | * | 5/1985 | Shiraishi | 180/7.1 |
| 4,638,445 | A | * | 1/1987 | Mattaboni | 701/23 |
| 4,733,737 | A | * | 3/1988 | Falamak | 180/7.1 |
| 4,875,172 | A | * | 10/1989 | Kanayama | 701/23 |
| 5,073,749 | A | * | 12/1991 | Kanayama | 318/587 |
| 5,186,270 | A | * | 2/1993 | West | 180/6.62 |
| 5,374,879 | A | * | 12/1994 | Pin et al. | 318/139 |
| 5,419,008 | A | * | 5/1995 | West | 16/25 |
| 5,630,566 | A | * | 5/1997 | Case | 248/122.1 |
| 5,857,534 | A | * | 1/1999 | DeVault et al. | 180/21 |
| 5,959,423 | A | | 9/1999 | Nakanishi et al. | |
| 6,135,228 | A | * | 10/2000 | Asada et al. | 180/204 |
| 6,259,806 | B1 | | 7/2001 | Green | |
| 6,292,713 | B1 | | 9/2001 | Jouppi et al. | |
| 6,346,950 | B1 | | 2/2002 | Jouppi | |
| 6,369,847 | B1 | | 4/2002 | James et al. | |
| 6,430,471 | B1 | | 8/2002 | Kintou et al. | |
| 6,463,361 | B1 | | 10/2002 | Wang et al. | |
| 6,474,434 | B1 | * | 11/2002 | Bech | 180/252 |
| 6,491,701 | B2 | | 12/2002 | Tierney et al. | |
| 6,496,099 | B2 | | 12/2002 | Wang et al. | |
| 6,535,793 | B2 | | 3/2003 | Allard | |
| 6,549,215 | B2 | | 4/2003 | Jouppi | |
| 2001/0054071 | A1 | | 12/2001 | Loeb | |
| 2002/0027597 | A1 | | 3/2002 | Sachau | |
| 2002/0057279 | A1 | | 5/2002 | Jouppi | |
| 2002/0058929 | A1 | | 5/2002 | Green | |
| 2002/0063726 | A1 | | 5/2002 | Jouppi | |
| 2002/0120362 | A1 | | 8/2002 | Lathan et al. | |
| 2002/0130950 | A1 | | 9/2002 | James et al. | |
| 2002/0141595 | A1 | | 10/2002 | Jouppi | |
| 2002/0183894 | A1 | | 12/2002 | Wang et al. | |
| 2003/0050733 | A1 | | 3/2003 | Wang et al. | |
| 2003/0151658 | A1 | | 8/2003 | Smith | |

FOREIGN PATENT DOCUMENTS

| | | | |
|---|---|---|---|
| CA | 2289697 A1 | 11/1998 | |
| JP | 07257422 A | * 10/1995 | B62D/9/00 |

OTHER PUBLICATIONS

Paulos et al., "A World Wide Web Telerobotic Remote Environment Browser", http://vive.cs.berkeley.edu/capek, 1995.

(Continued)

*Primary Examiner*—Paul Ip
(74) *Attorney, Agent, or Firm*—Irell & Manella LLP (57) ABSTRACT

A robot that includes a plurality of roller assemblies. Each roller assembly may include a transmission roller that is spun by a drive mechanism to rotate a drive ball. Rotation of the drive ball propels the robot across a surface. The transmission roller is in continuous contact with the drive ball. Continuous contact between the roller and ball eliminates roller induced wobble in the robot movement, reduces impact forces and resultant stress within the roller assembly and allows for the use of a drive ball that is more complaint than balls in the prior art.

40 Claims, 10 Drawing Sheets

OTHER PUBLICATIONS

Telepresence Research, Inc., "Telepresence Mobile Robot System", http://www.telepresence.com/telepresence-research/TELERROBOT/, Feb. 20, 1995.

Zorn, Benjamin G., "Ubiquitous Telepresence", http://www.cs.colorado.edu/~zorn/ut/vision.html, Mar. 5, 1996.

Paulos, et al. , "Ubiquitous Tele–embodiment: Applications and Implications", International Journal of Human Computer Studies, Jun. 1997, vol. 46, No. 6, pp. 861–877.

Paulos, et al., "Designing Personal Tele–Embodiment", Presented at the IEEE International Conference on Robotics and Animation, Leuven, Belgium, May 20, 1998.

Harmo et al., "Moving Eye—Interactive Telepresence Over Internet With a Ball Shaped Mobile Robot", 2000.

Loeb, Gerald, "Virtual Visit: Improving Communication for Those Who Need It Most", 2001.

Paulos, Eric John, "Personal Tele–Embodiment", 2001.

Hees, William P., "Communication Design for a Remote Presence Robot", Jan. 14, 2002.

Jacobs et al., "TeleRehab: Applying Telemedicine to Outpatient Physical Therapy", 2002.

Jouppi, et al., :Mutually–Immersive Audio Telepresence, Audio Engineering Society Convention Paper, presented at $113^{th}$ Convention Oct. 2002.

Jouppi, Norman P., "First Steps Towards Mutually–Immersive Mobile Telepresence", 2002.

Bauer, Jeffrey C., "Service Robots in Health Care: The Evolution of Mechanical Solutions to Human Resource Problems", Jun. 2003.

Eillison et al., "Telerounding and Patient Satisfaction Following Surgery", no date.

* cited by examiner

HOLONOMIC PLATFORM FOR A ROBOT

BACKGROUND OF THE INVENTION

1. Field of the Invention

The subject matter disclosed generally relates to a drive roller assembly for a mobile robot.

2. Background Information

There have been developed various mobile robots that have a variety of different drive mechanisms to power the robot across a surface. For example, U.S. Pat. No. 5,374,879 issued to Pin et al., discloses a holonomic platform that includes three separate drive roller assemblies. Each drive roller assembly includes a pair of rollers that are spun by a drive motor. The rollers periodically make contact with the ground to exert a frictional force that propels the robot across a surface.

One or more of the three rollers assemblies is typically powered to drive the robot in a desired direction. The rollers of each roller assembly are coupled to the motor by a bracket. The bracket allows passive movement of the rollers that are not driven by a motor. Unfortunately, the brackets prevent continuous contact between a single roller and the underlying surface of the robot. For this reason each roller assembly requires two rollers that operate out of phase so that one roller is always in contact with the surface.

application Ser. No. 206,457 filed in the name of Wang et al. and assigned to the assignee of this application, InTouch Health, Inc. discloses a holonomic platform for a remote controlled robot. The platform includes three separate roller assemblies. Each roller assembly includes a pair of transmission rollers that engage and spin a drive ball. Rotation of the drive ball moves the robot across a surface. Like the Pin device of the prior art the transmission rollers of each subassembly are coupled to a motor by a bracket. The bracket allows desirable passive movement of the transmission rollers but prevents continuous contact between a single roller and the drive wheel.

The rollers operate out of phase so that one of the rollers is always in contact with the drive ball. If the relative phase of the rollers changes, the movement of the robot may develop a wobble. Additionally, the out of phase rotation of the transmission rollers may create undesirable impact forces and resultant stresses on the drive ball and supporting bearings. The impact forces require usage of a relatively hard drive ball.

BRIEF SUMMARY OF THE INVENTION

A drive roller assembly for a robot. The drive roller assembly may include a transmission roller that is in continuous contact with a drive ball. The transmission roller is coupled to a drive mechanism.

DETAILED DESCRIPTION

Disclosed is a robot that includes a plurality of roller assemblies. Each roller assembly may include a transmission roller that is spun by a drive mechanism to rotate a drive ball. Rotation of the drive ball propels the robot across a surface. The transmission roller is in continuous contact with the drive ball. Continuous contact between the roller and ball eliminates roller induced wobble in the robot movement, reduces impact forces and resultant stress within the roller assembly and allows for the use of a drive ball that is more compliant than balls in the prior art.

Figure 1:
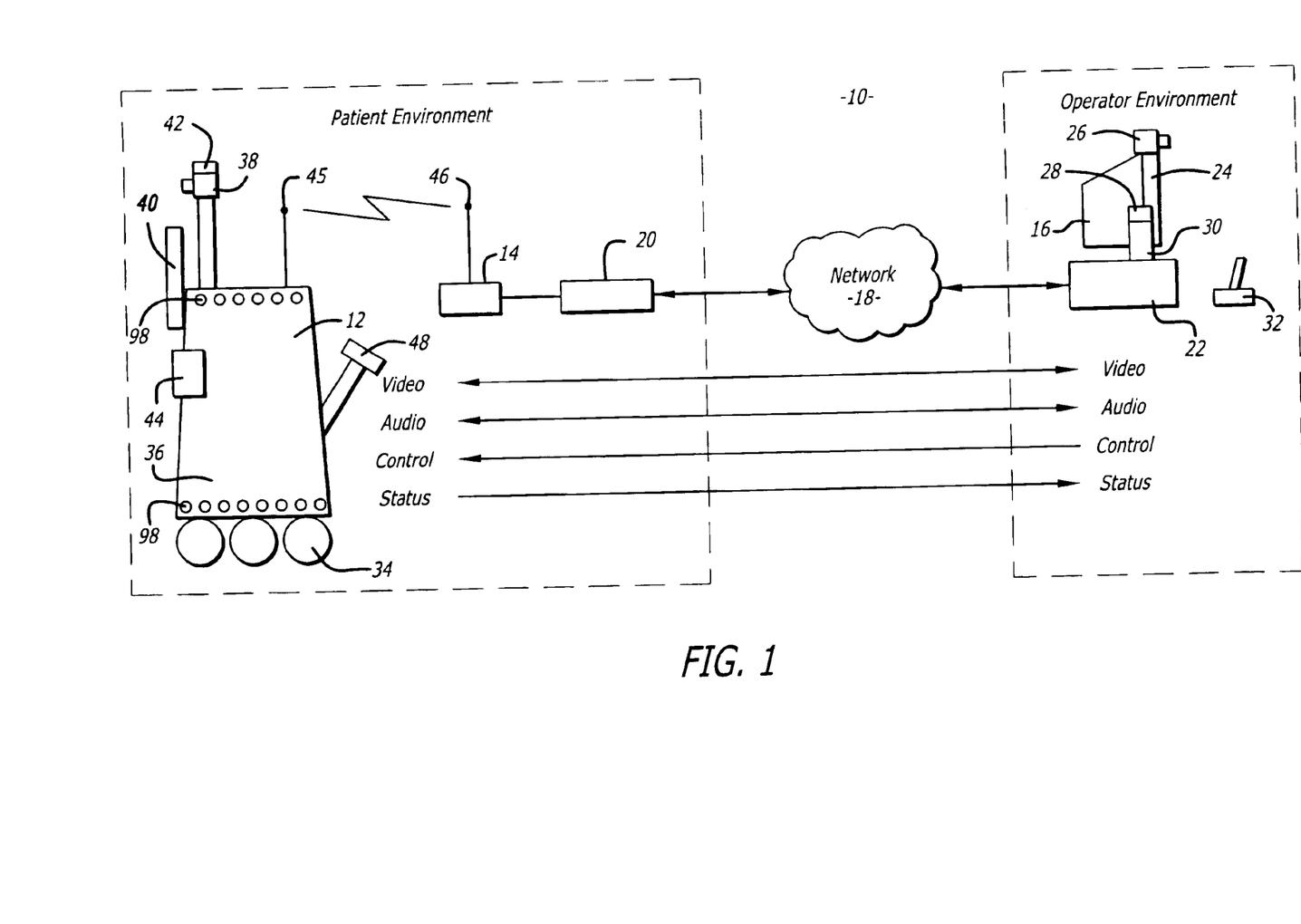
FIG. 1 is an illustration of a robotic system.

Referring to the drawings more particularly by reference numbers, FIG. 1 shows a robotic system 10. The robotic system 10 includes a robot 12, a base station 14 and a remote control station 16. The remote control station 16 may be coupled to the base station 14 through a network 18. By way of example, the network 18 may be either a packet switched network such as the Internet, or a circuit switched network such has a Public Switched Telephone Network (PSTN) or other broadband system. The base station 14 may be coupled to the network 18 by a modem 20 or other broadband network interface device.

The remote control station 16 may include a computer 22 that has a monitor 24, a camera 26, a microphone 28 and a speaker 30. The computer 22 may also contain an input device 32 such as a joystick or a mouse. The control station 16 is typically located in a place that is remote from the robot 12. Although only one remote control station 16 is shown, the system 10 may include a plurality of remote stations. Additionally, although only one robot 12 is shown, it is to be understood that the system 10 may have a plurality of robots 12. In general any number of robots 12 may be controlled by any number of remote stations 16. For example, one remote station 16 may be coupled to a plurality of robots 12, or one robot 12 may be coupled to a plurality of remote stations 16.

The robot 12 includes a movement platform 34 that is attached to a robot housing 36. Also attached to the robot housing 36 are a camera 38, a monitor 40, a microphone(s) 42 and a speaker 44. The microphone 42 and speaker 30 may create a stereophonic sound. The robot 12 may also have an antenna 45 that is wirelessly coupled to an antenna 46 of the base station 14. The system 10 allows a user at the remote control station 16 to move the robot 12 through the input device 32. The robot camera 38 is coupled to the remote monitor 24 so that a user at the remote station 16 can view a patient. Likewise, the robot monitor 40 is coupled to the remote camera 26 so that the patient can view the user. The microphones 28 and 42, and speakers 30 and 44, allow for audible communication between the patient and the user. The robot 12 may further have a handle 48 that can be rotated to a down position to allow someone to manually push or pull the robot 12.

The remote station computer 22 may operate Microsoft OS software and WINDOWS XP or other operating systems such as LINUX. The remote computer 22 may also operate a video driver, a camera driver, an audio driver and a joystick driver. The video images may be transmitted and received with compression software such as MPEG CODEC.

Figure 2:
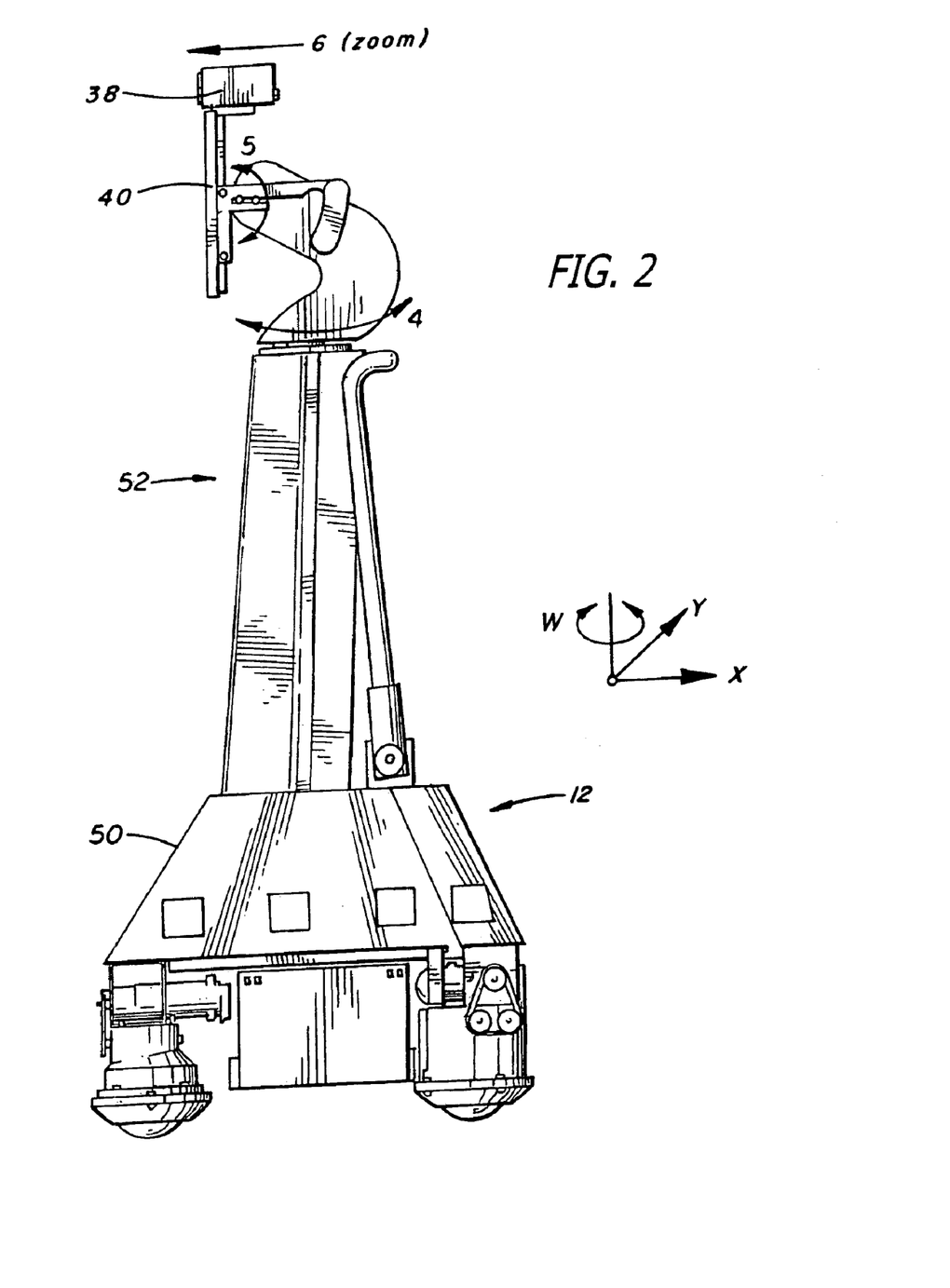
FIG. 2 is side view of a robot.

FIG. 2 shows an embodiment of the robot 12. The robot 12 may include a holonomic platform 50 that is attached to a robot housing 52. The holonomic platform 50 provides three degrees of freedom to allow the robot 12 to move in any direction.

The robot 12 may have a pedestal assembly 52 that supports the camera 38 and the monitor 40. The pedestal assembly 52 may have two degrees of freedom so that the camera 26 and monitor 24 can be swiveled and pivoted as indicated by the arrows.

Figure 3:
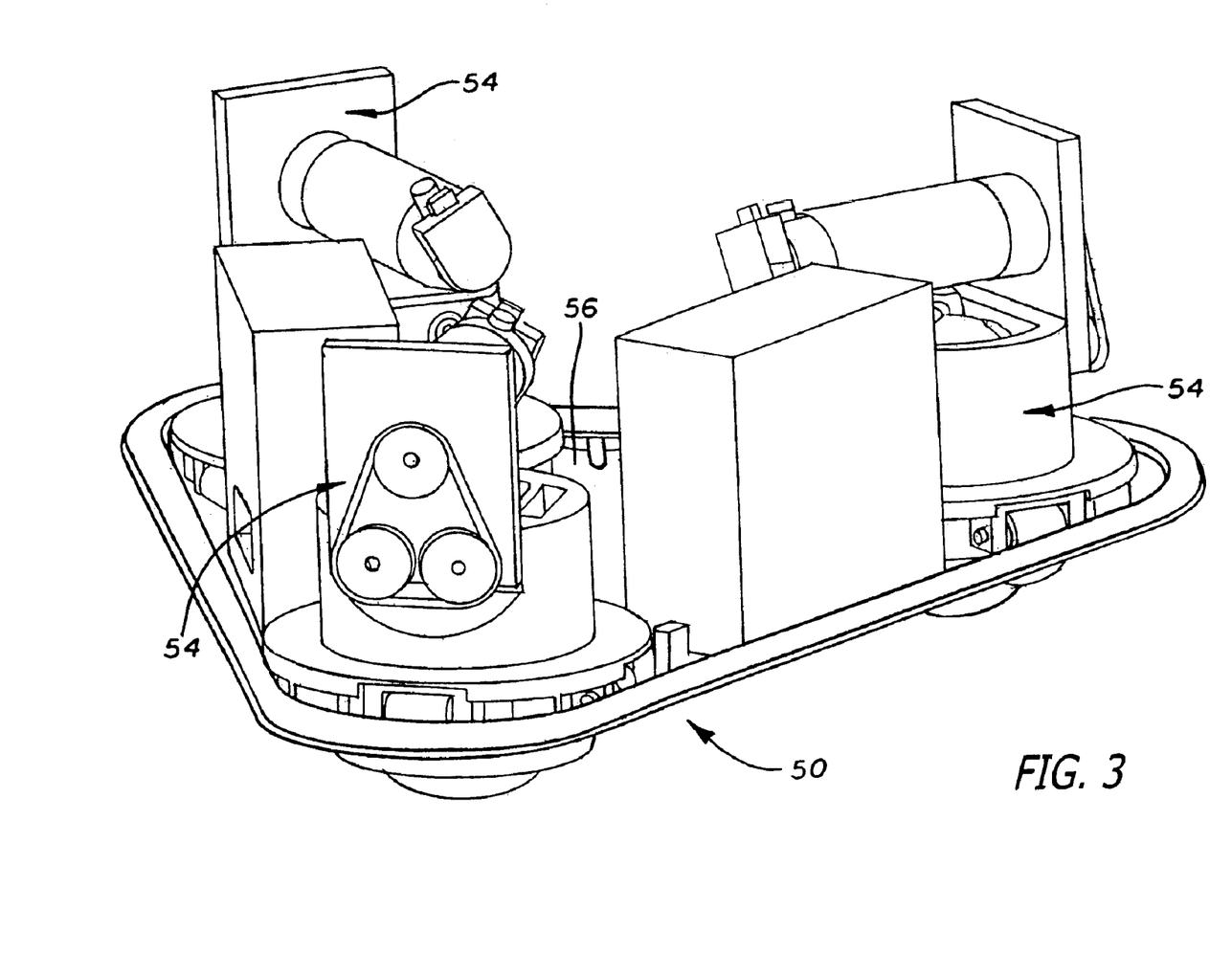
FIG. 3 is a top perspective view of a holonomic platform of the robot.

As shown in FIG. 3 the holonomic platform 50 may include three roller assemblies 54 that are mounted to a base plate 56. The roller assemblies 54 allow for movement in any direction.

Figure 4:
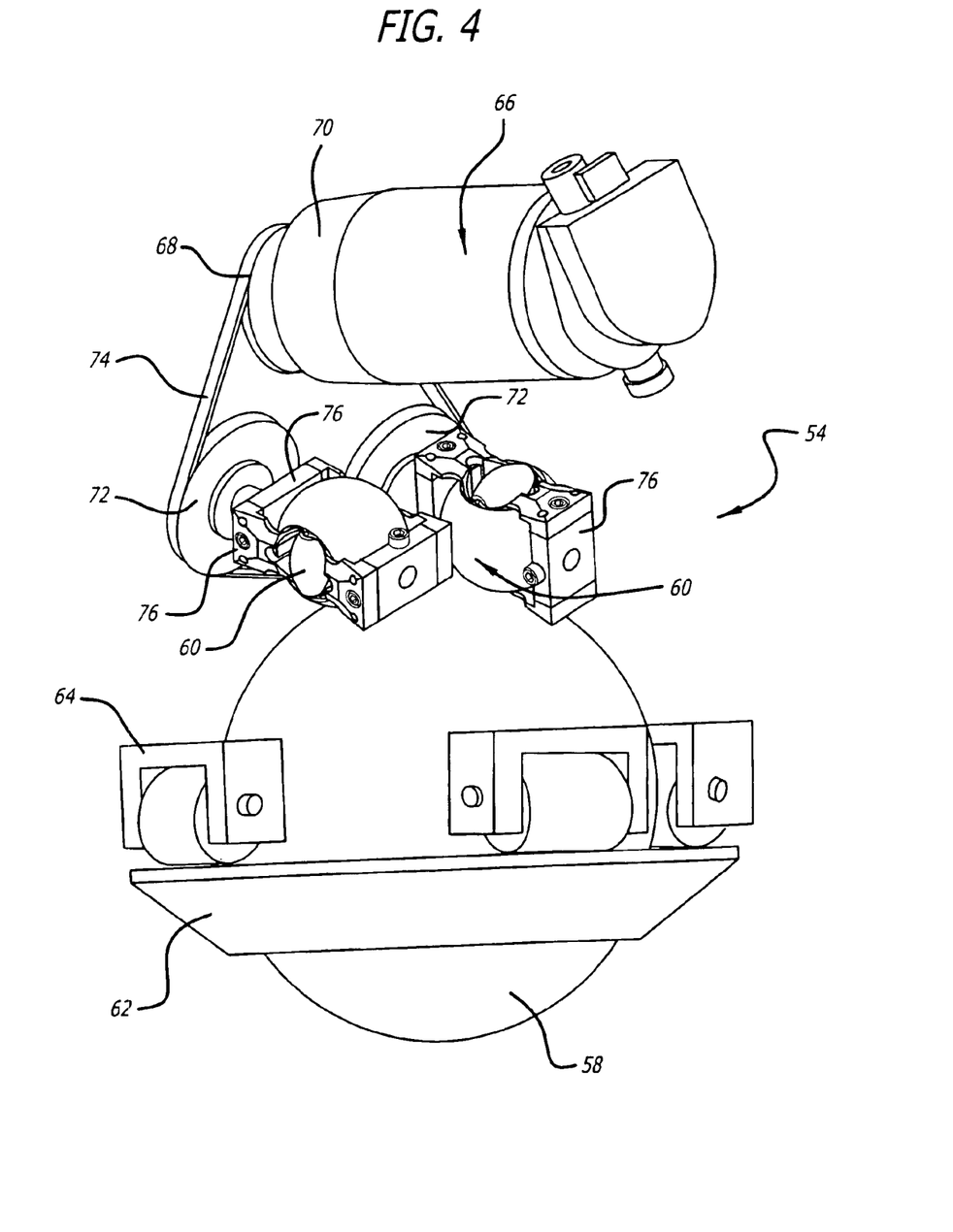
FIG. 4 is a side perspective view of a roller assembly of the holonomic platform.

FIG. 4 shows an embodiment of a roller assembly 54. Each assembly 54 may include a drive ball 58 that is driven by a pair of transmission rollers 60. The assembly 54 includes a retainer ring 62 and a plurality of bushings 64 that allow the ball 58 to rotate but prevent movement in a z direction.

The transmission rollers 60 are coupled to a motor assembly 66. The motor assembly 66 includes an output pulley 68 attached to a motor 70. The output pulley 68 is coupled to a pair of ball pulleys 72 by a drive belt 74. The ball pulleys 72 are attached to a transmission bracket 76. The motor assembly 66 receives output signals from a motor control circuit (not shown) that energizes the motor and rotates the output pulley 68.

Rotation of the output pulley 68 rotates the ball pulleys 72. Rotation of the ball pulleys 72 cause the transmission rollers 60 to rotate and spin the ball 58 through frictional forces. The transmission rollers 60 are in continuous contact with the drive ball 58. Spinning the ball 58 moves the robot 12. The bracket 76 allows the transmission rollers 60 to freely spin and allow orthogonal directional passive movement when one of the other roller assemblies 60 is driving and moving the robot 12.

Figure 5:
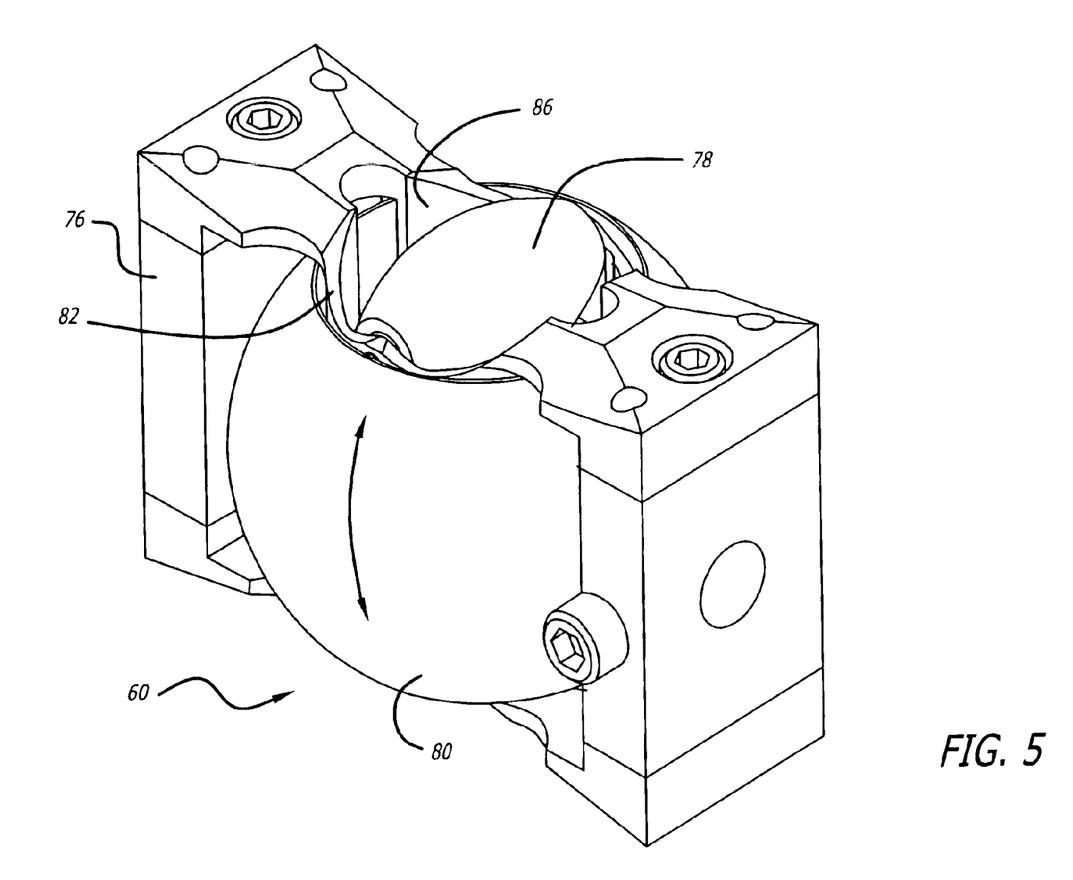
FIG. 5 is a perspective view of a transmission roller of the roller assembly.
Figure 6:
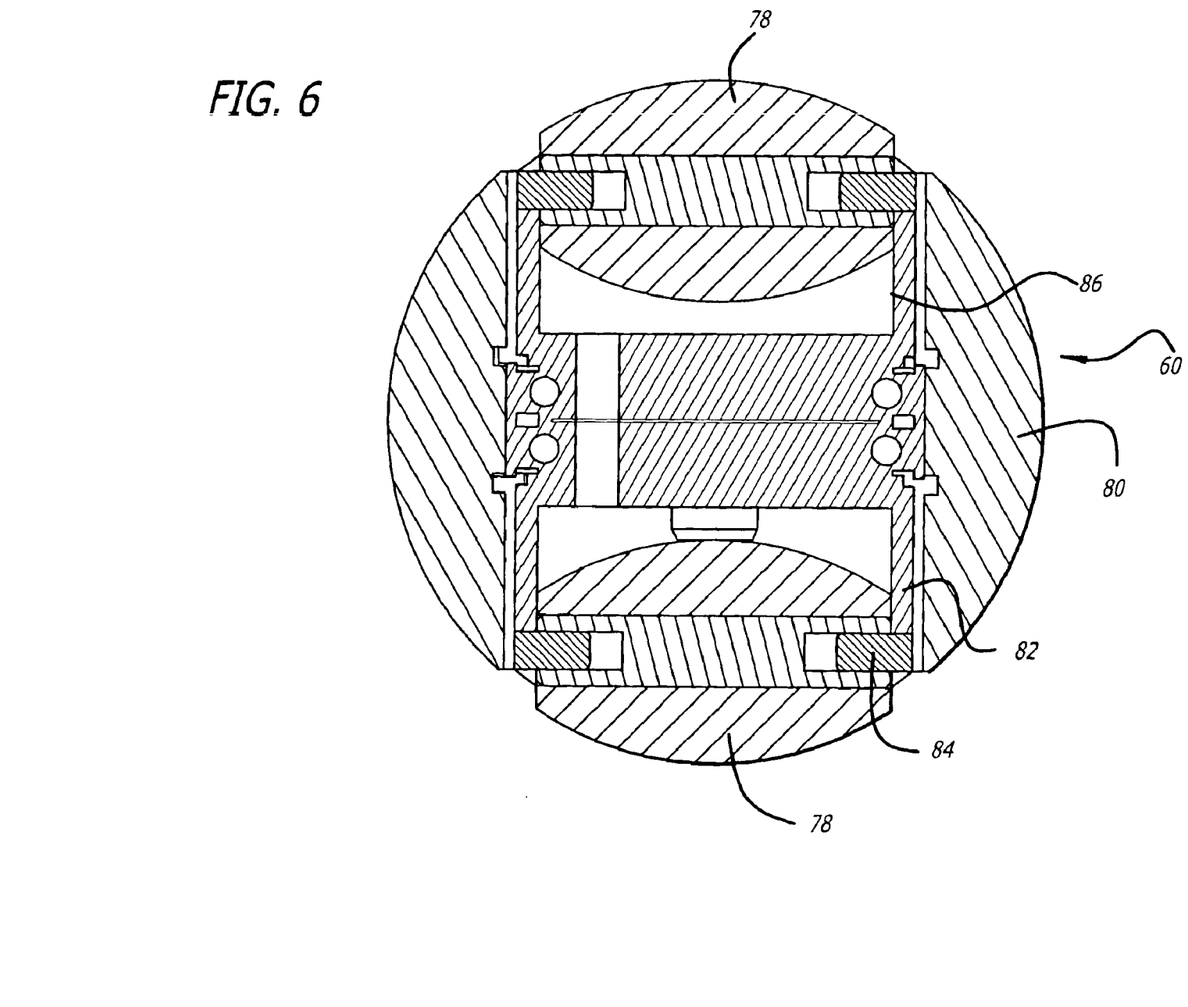
FIG. 6 is a cross-sectional view of the transmission roller.
Figure 7:
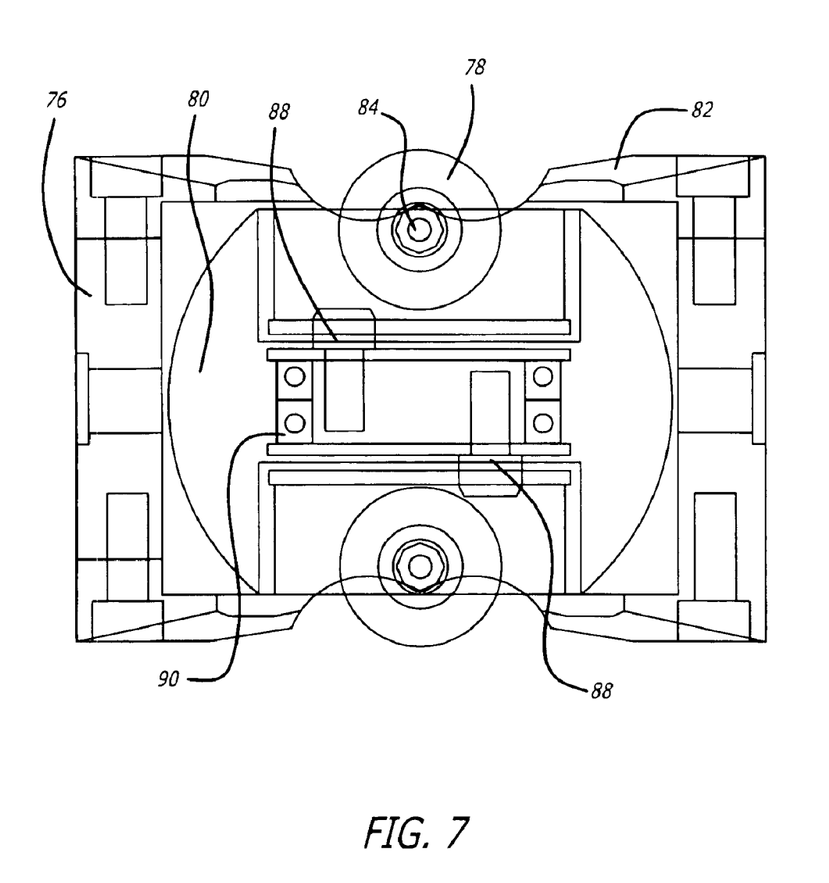
FIG. 7 is a cross-sectional view of the transmission roller.

FIGS. 5, 6 and 7 show an embodiment of a transmission roller 60. Each transmission roller 60 may include a pair of addendum rollers 78 attached to a primary roller 80. The addendum rollers 78 may be attached to extension plates 82 of the bracket 76 by pins 84. The extension plates 82 of the bracket 76 may extend into an inner bore 86 of the primary roller 78 and be attached within the roller 78 by fasteners 88. The transmission roller 60 may have bearings 90 that allows the primary roller 80 to roll while the bracket 72 is stationary.

Figure 8:
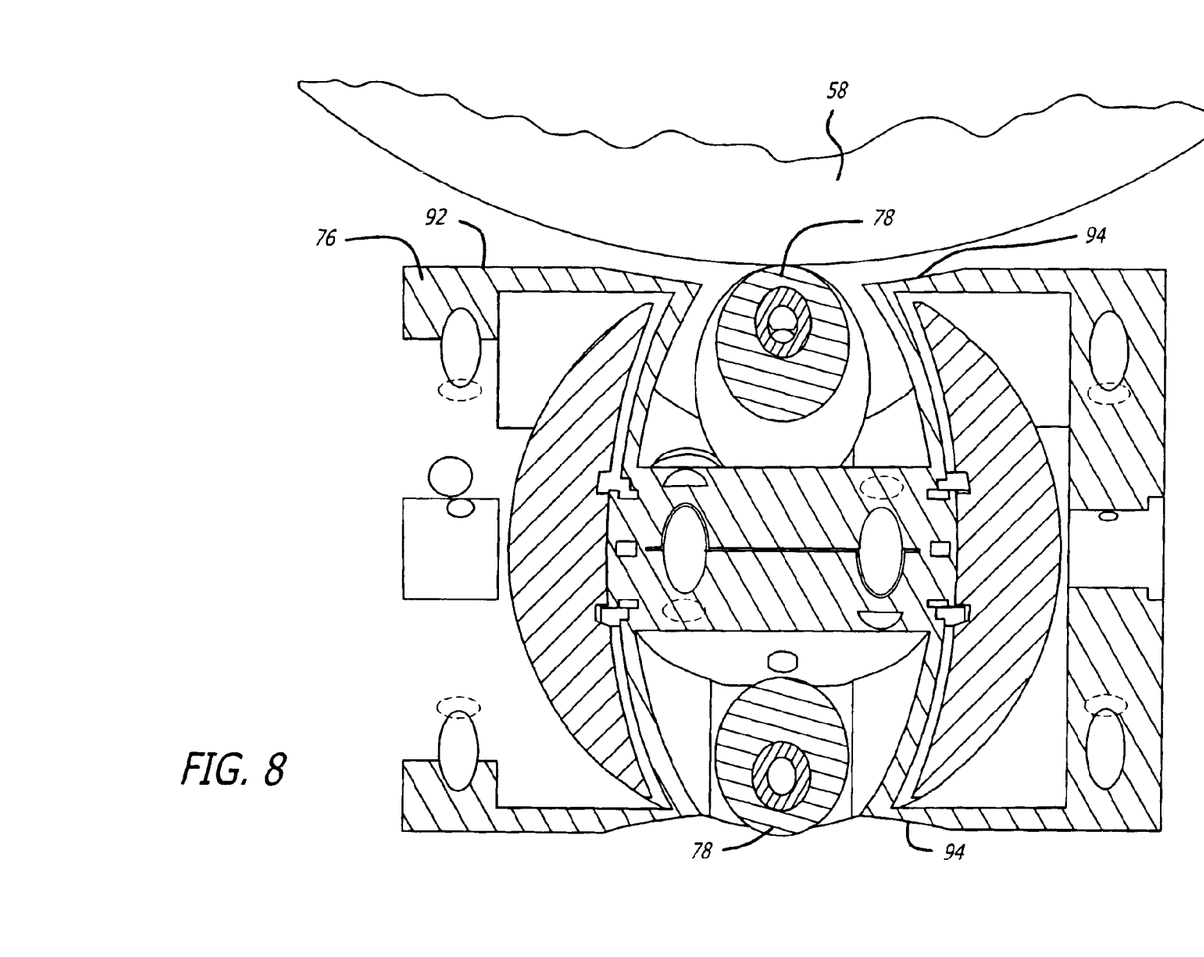
FIG. 8 is a cross-sectional view of the transmission roller in contact with a drive ball.

As shown in FIG. 8 the addendum rollers 78 may extend beyond an outer surface 92 of the bracket 76 so that the rollers 78 are in contact with the drive ball 58. The bracket 76 may have a pair of grooves 94 with a radius that provides a sufficient clearance between the drive ball 58 and the bracket outer surface 92. Alternatively, the grooves 94 may have a radius so that the addendum rollers 78 may be placed at or below the outer bracket surface 90 and still not have interface between the bracket 76 and the drive ball 58.

Referring to FIG. 5, the transmission roller 60 is rotated as indicated by the arrows. Either the primary roller 80, or one of the addendum rollers 78, is in continuous contact with the drive ball (not shown in FIG. 5). Consequently, the transmission rollers 60 are in continuous contact with the drive ball 58. There are no impact forces associated with the out of phase roller assemblies of the prior art. There are no phase changing wobble issues found with the out of phase roller assemblies of the prior art. Additionally, because of the absence of impact forces a more compliant drive ball may be incorporated into the robot.

Figure 9:
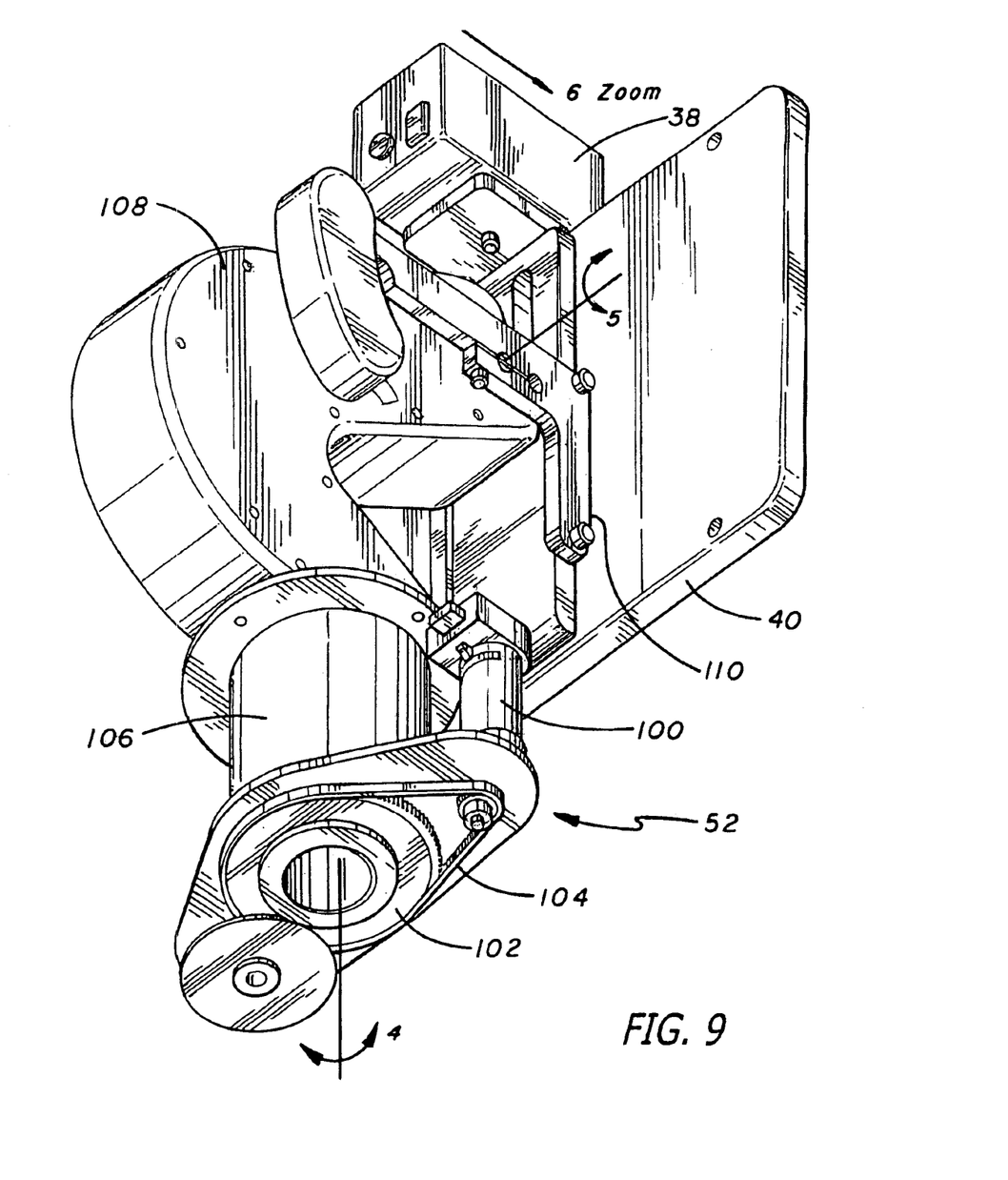
FIG. 9 is a bottom perspective view showing a pedestal assembly of the robot.

As shown in FIG. 9, the pedestal assembly 52 may include a motor 100 that is coupled to a gear 102 by a belt 104. The gear 102 is attached to a bushing 106. The bushing 106 is attached to an arm 108 that is coupled to the camera 38 and monitor 40 by a bracket 110. Activation of the motor 100 rotates the gear 102 and causes the camera 38 and monitor 40 to spin about a spin axis (see also FIG. 2) as indicated by the arrows 4. The motor 100 provides a fourth degree of freedom for the camera 38 and the monitor 40.

Figure 10:
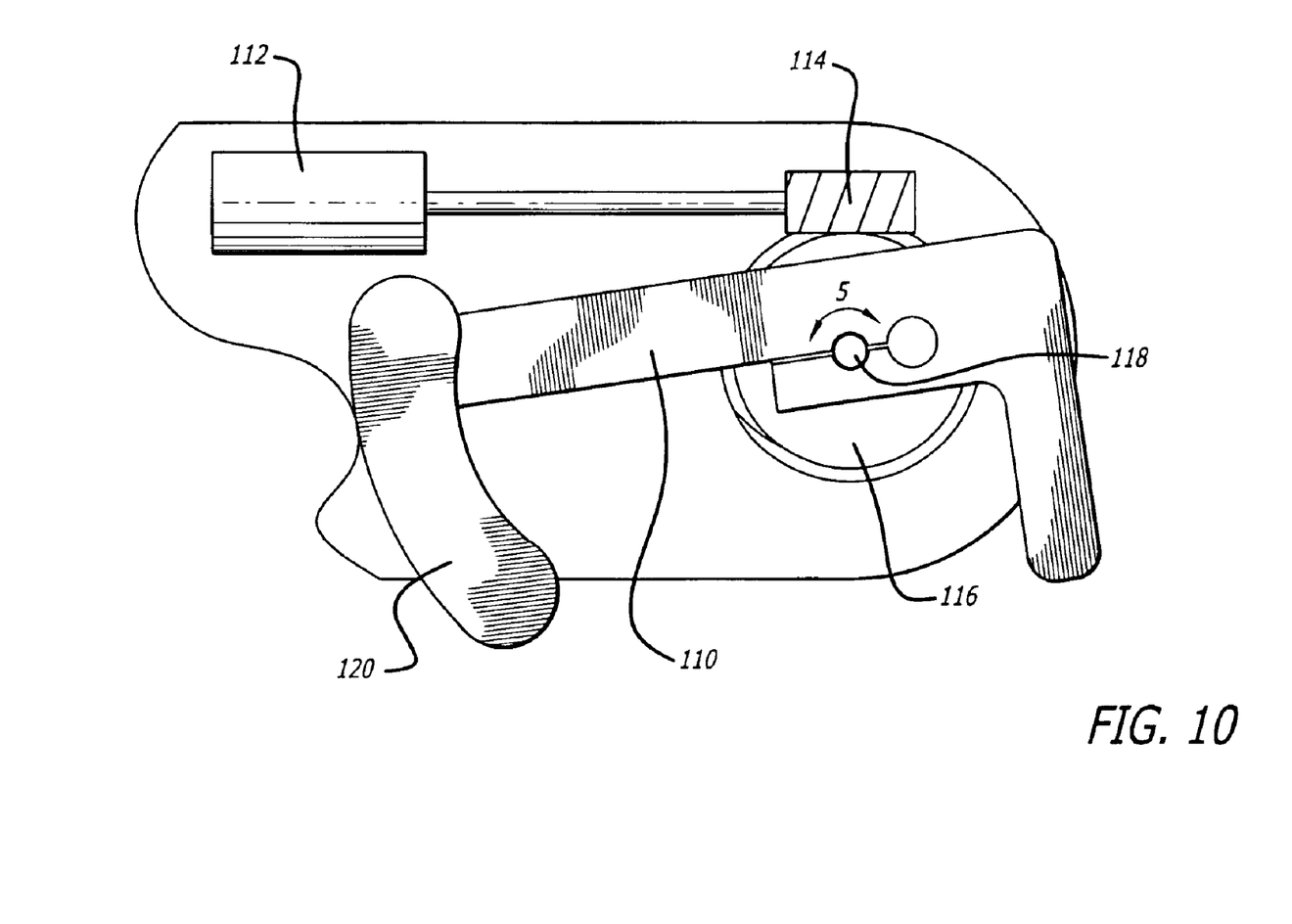
FIG. 10 is a sectional view showing an actuator of the pedestal assembly.

As shown in FIG. 10, the assembly 52 may further include a tilt motor 112 within the arm 108 that can cause the monitor 40 and camera 38 to pivot about a pivot axis as indicated by the arrows 5 (see also FIG. 2). The pivot axis may intersect the spin axis so that the assembly 52 functions like a neck that can turn the camera 38 side to side, and up and down.

The tilt motor 112 may rotate a worm 114 that rotates a worm gear 116. Pin 118 is rigidly attached to both the worm gear 116 and the bracket 110 so that rotation of the gear 116 pivots the camera 38 and the monitor 40. The bracket 110 may have a counterweight 120 to counter the weight of the camera 38 and monitor 40. The camera 38 may also include a zoom feature to provide yet another degree of freedom for the operator. The motor 112 provides a fifth degree of freedom for the camera 38 and the monitor 40. Although motors 100 and 110 are shown and described, it is to be understood that other actuators could be implemented into the robot 12.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

For example, although two transmission rollers are shown and described, it is to be understood that each roller assembly may have only one transmission roller. Additionally, although each roller assembly is described and shown as having a drive ball, it is to be understood that the assembly may not have a drive ball, wherein the transmission roller(s) is in direct contact with the surface.

What is claimed is:

1. A drive roller assembly of a platform that moves along a surface, comprising:
   a platform;
   a drive ball that is coupled to said platform and rotates along the surface;
   a transmission roller that is in continuous contact with said drive ball, said transmission roller can actively rotate about a first axis and passively rotate about a second axis, and,
   a drive mechanism that is coupled to said platform and rotates said transmission roller wherein said rotating transmission roller rotates said drive ball and moves said platform.

2. The assembly of claim 1, wherein said drive mechanism includes a motor.

3. The assembly of claim 1, wherein said transmission roller is attached to a bracket.

4. The assembly of claim 3, wherein said bracket has a groove in an outside surface that allows a portion of said transmission roller to make contact with said drive ball.

5. The assembly of claim 3, wherein said drive mechanism includes a pulley that is coupled to a motor and said bracket.

6. The assembly of claim 1, wherein said transmission roller includes an addendum roller attached to a primary roller.

7. A drive roller assembly of a platform that moves along a surface, comprising:
- a platform:
- a drive ball that is coupled to said platform and rotates along the surface;
- a transmission roller that is in continuous contact with said drive ball, said transmission roller can actively rotate about a first axis and passively rotate about a second axis; and,
- a drive means for rotating said transmission roller and driving said drive ball wherein said rotating transmission roller rotates said drive ball and moves said platform.

8. The assembly of claim 7, wherein said drive means includes a motor.

9. The assembly of claim 7, wherein said transmission roller is attached to a bracket.

10. The assembly of claim 9, wherein said bracket has a groove in an outside surface that allows a portion of said transmission roller to make contact with said drive ball.

11. The assembly of claim 9, wherein said drive means includes a pulley that is coupled to a motor and said bracket.

12. The assembly of claim 7, wherein said transmission roller includes an addendum roller attached to a primary roller.

13. A method for operating a roller assembly comprising:
- activating a drive mechanism within a mobile robot;
- rotating a transmission roller about a first axis with the drive mechanism;
- rotating a drive ball to rotate along a surface through rotation of the transmission roller that is in continuous contact with the drive ball; and
- rotating the transmission roller about a second axis.

14. A mobile robot that moves along a surface, comprising: a platform;
- a first drive roller assembly that is coupled to said platform and includes;
- a drive ball that is coupled to said platform and rotates along the surface;
- a transmission roller that is in continuous contact with said drive ball, said transmission roller can actively rotate about a first axis and passively rotate about a second axis;
- a drive mechanism coupled to said transmission roller;
- a pedestal coupled to said platform;
- a camera coupled to said pedestal; and,
- a screen coupled to said pedestal.

15. The robot of claim 14, wherein said drive mechanism includes a motor.

16. The robot of claim 14, wherein said transmission roller is attached to a bracket.

17. The robot of claim 16, wherein said bracket has a groove in an outside surface that allows a portion of said transmission roller to make contact with said drive ball.

18. The robot of claim 16, wherein said drive mechanism includes a pulley that is coupled to a motor and said bracket.

19. The robot of claim 14, wherein said transmission roller includes an addendum roller attached to a primary roller.

20. The robot of claim 14, further comprising a second drive roller assembly and a third drive roller assembly.

21. The robot of claim 14, wherein said pedestal includes a pivot drive mechanism that is coupled to said camera and said screen, and a swivel drive mechanism that is coupled to said camera and said screen.

22. A mobile robot that moves along a surface, comprising:
- a platform;
- a first drive roller assembly that is coupled to said platform and includes;
- a drive ball that is coupled to said platform and rotates along the surface;
- a transmission roller that is in continuous contact with said drive ball, said transmission roller can actively rotate about a first axis and passively rotate a second axis;
- drive means for rotating said transmission roller and driving said drive ball;
- a pedestal coupled to said platform;
- a camera coupled to said pedestal; and,
- a screen coupled to said pedestal.

23. The robot of claim 22, wherein said drive means includes a motor.

24. The robot of claim 22, wherein said transmission roller is attached to a bracket.

25. The robot of claim 24, wherein said bracket has a groove in an outside surface that allows a portion of said transmission roller to make contact with said drive ball.

26. The robot of claim 24, wherein said drive means includes a pulley that is coupled to a motor and said bracket.

27. The robot of claim 22, wherein said transmission roller includes an addendum roller attached to a primary roller.

28. The robot of claim 22, further comprising a second drive roller assembly and a third drive roller assembly.

29. The robot of claim 22, wherein said pedestal includes pivot means for pivoting said camera and said screen, and swivel means for swiveling said camera and said screen.

30. A method for operating a mobile robot, comprising:
- generating an output signal to move a mobile robot;
- activating a drive mechanism within the mobile robot;
- rotating a transmission roller about a first axis with the drive mechanism;
- rotating a drive ball to rotate along a surface through rotation of the transmission roller that is in continuous contact with the drive ball; and
- rotating the transmission roller about a second axis.

31. The method of claim 30, further comprising swiveling a camera and a screen of the robot and pivoting the camera and the screen.

32. A drive roller assembly for a mobile robot that moves across a surface, comprising:
- a roller that includes an addendum roller attached to a primary roller that together are in continuous contact with the surface, said roller can passively rotate about a first axis;
- a bracket coupled to said roller; and,
- a drive mechanism coupled to said bracket to rotate said roller about a second axis.

33. The assembly of claim 32, wherein said drive mechanism includes a motor.

34. The assembly of claim 32, wherein said bracket has a groove in an outside surface that allows a portion of said roller to make contact with the surface.

35. The assembly of claim 32, wherein said drive mechanism includes a pulley that is coupled to a motor and said bracket.

36. A drive roller assembly for a mobile robot that moves across a surface, comprising:

a roller that includes an addendum roller attached to a primary roller that together are in continuous contact with the surface, said roller can passively rotate about a first axis;

a bracket coupled to said roller; and, drive means for rotating said bracket and said roller about a second axis.

37. The assembly of claim 36, wherein said drive means includes a motor.

38. The assembly of claim 36, wherein said bracket has a groove in an outside surface that allows a portion of said transmission roller to make contact with the surface.

39. The assembly of claim 36, wherein said drive means includes a pulley that is coupled to a motor and said bracket.

40. A method for operating a drive roller assembly for a mobile robot that moves across a surface, comprising:

activating a drive mechanism within a mobile robot; and, rotating a roller that can rotate about at least two axes and is supported by a bracket, and includes an addendum roller attached to a primary roller that are together in continuous contact with the surface, to move the mobile robot.

* * * * *